United States Patent [19]

Standing

[11] 4,394,583

[45] Jul. 19, 1983

[54] ELECTRIC FENCE ENERGIZERS

[76] Inventor: Colin A. Standing, Hamilton, New Zealand

[21] Appl. No.: 83,366

[22] Filed: Oct. 10, 1979

Related U.S. Application Data

[63] Continuation of Ser. No. 942,870, Sep. 15, 1978, abandoned.

[30] Foreign Application Priority Data

Sep. 13, 1977 [NZ] New Zealand ........................ 185174

[51] Int. Cl.³ ........................... B23P 1/02; G05F 1/08

[52] U.S. Cl. ................................ 307/108; 307/132 R; 315/206

[58] Field of Search ............... 307/108, 132 R, 132 E, 307/132 EA, 132 T, 132 V, 132 M; 315/206, 209 R

[56] References Cited

U.S. PATENT DOCUMENTS

| | | | |
|---|---|---|---|
| 3,115,610 | 12/1963 | Beguin | 307/132 R |
| 3,392,285 | 7/1968 | Olson | 307/108 |
| 3,655,995 | 4/1972 | Malme | 307/132 R |
| 3,681,656 | 8/1972 | Mitchell | 307/108 X |

FOREIGN PATENT DOCUMENTS

| | | |
|---|---|---|
| 1085417 | 10/1967 | United Kingdom . |
| 1154072 | 6/1969 | United Kingdom . |
| 1157851 | 7/1969 | United Kingdom . |
| 1225918 | 3/1971 | United Kingdom . |
| 1476647 | 8/1977 | United Kingdom . |

*Primary Examiner*—Michael L. Gellner
*Assistant Examiner*—James L. Dwyer
*Attorney, Agent, or Firm*—Holman & Stern

[57] ABSTRACT

An electric fence energizer which comprises a capacitor connected across a power supply to an output transformer. An SCR is provided between the capacitor and the primary stage of the transformer and the SCR is arranged to discharge the capacitor. A controllable switch is provided with a control circuit which controls the charge in the capacitor via the controllable switch and also triggers the SCR.

5 Claims, 2 Drawing Figures

ELECTRIC FENCE ENERGIZERS

This is a continuation of application Ser. No. 942,870, filed Sept. 15, 1978, now abandoned.

BACKGROUND OF THE INVENTION

The invention relates to electric fence energizer.

It is therefore an object of the present invention to provide an electric fence energizer which will at least provide the public with a useful choice.

SUMMARY OF THE INVENTION

Accordingly the invention may broadly be said to consist in an electric fence energizer comprising a capacitor connected across a power supply to an output transformer, an SCR between said capacitor and the primary stage of said transformer arranged to discharge said capacitor, a controllable switch, a control circuit adapted to control the charge in said capacitor via said controllable switch and to trigger said SCR.

To those skilled in the art to which is invention relates many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

One preferred form of the invention will now be described with reference to the accompanying drawings in which.

DETAILED DESCRIPTION OF A PREFERRED EMBODIMENT

Figure 1:
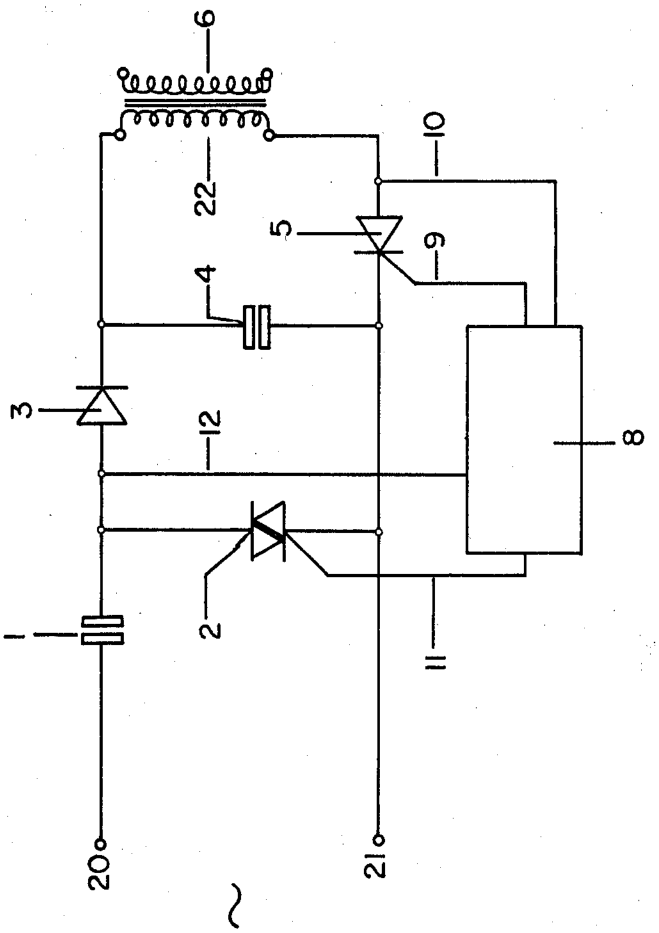
FIG. 1 is a block circuit diagram of an electric fence energizer according to the invention.

In the preferred form of the invention an electric fence energizer is constructed as follows. A capacitor 1, a controllable switch 2, diode 3 and capacitor 4 are connected as shown in FIG. 1 to form a voltage doubler circuit in which the charge in the capacitor 4 is controlled by a control circuit 8 via the triac 2. The controllable switch preferably comprises a triac 2 but may comprise an alternative electronic deivce such as an SCR, transistor or solid state relay. The circuit is connected to a power input by way of terminals 20 and 21. The triac 2 derives its gate trigger input from a control circuit shown in block form in FIG. 1 at 8 and within specked outline in FIG. 2 via trigger connection 11. Control circuit 8 obtains triac turn-on sense from 12. The circuit is provided with an SCR 5 coupled between the capacitor 4 and the primary winding 22 of the output transformer 6 to give the required output pulse of current in the transformer 6. The SCR 5 derives its gate trigger from a clock circuit such as a 1 Hz clock circuit 13 via trigger connection 9. The clock circuit could be derived from 50/60 Hz mains frequency by suitable division.

Under normal conditions the control circuit 8 applies the necessary half cycle control to the triac 2 causing the capacitor 4 to charge. When the voltage across the capacitor 4 reaches a predetermined value the voltage across line 10 causes the control circuit 8 to inhibit any further charging of the capacitor 4. Thus, the stored charge on the capacitor 4 is held constant for a period prior to discharge. In this manner a constant voltage is developed across the capacitor 4 over a limited input voltage range provided that 2 2×r.m.s. input voltage is greater than the required predetermined voltage across the capacitor. As the capacitor 4 is discharged every second by the SCR 5 triggered by the 1 Hz clock circuit via connection 9 a constant output pulse voltage is provided by the output transformer 6 within a limited input supply range.

Under fault conditions such that the SCR 5 has entered an uncontrolled breakdown mode of operation the sense line 10 detects the abnormal turn-on of the SCR 5 and inhibits further charging of the capacitor 4 via the control circuit 8 through the trigger line 11 to the triac 2.

When the correct time for the triggering of the SCR 5 is attained as determined by the 1 Hz clock circuit a reset signal enables the control circuit 8 and allows the capacitor to charge until abnormally discharged again by the breakdown condition of the SCR 5. In this manner a low voltage breakdown of the SCR 5 does not result in an output repetition rate that exceeds the repetition rate of the 1 Hz clock circuit 3.

Figure 2:
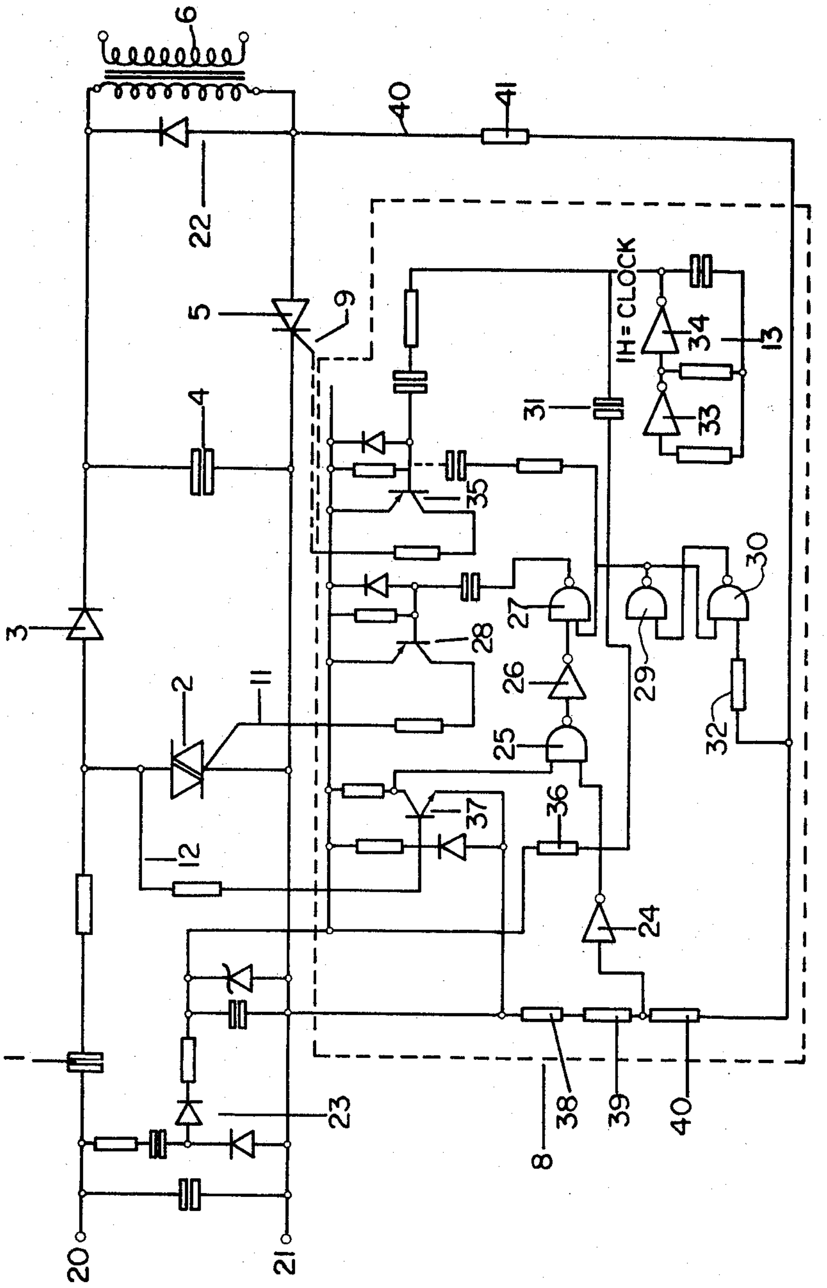
FIG. 2 is a circuit diagram showing the components of the electric fence energizer described in FIG. 1.

The effects of the control circuit 8 may be obtained in many ways and the circuit of FIG. 2 provides one example. In this circuit the circuitry at 23 is arranged as a power supply to give in the embodiment described a 15 V power supply.

When terminal 21 is more positive than terminal 22 sense line 12 applies a pulse to the base of transistor 37. From the collector of transistor 37 a shaped square wave at mains frequency is obtained and therefore transistor 37 provides a detector for zero crossing of terminals 21 and 22. The collector output of transistor 37 is applied to one input of gate 25. The other input to gate 25 is supplied from Schmitt trigger inverter 24 which has applied thereto a voltage which is a sample, determined by the values of resistors 38,39,40 and 41 of the voltage on line 10. Resistors 38 and 39 allow trimming of these values. Line 10 detects the voltage on capacitor 4 and when this reaches its predetermined maximum value the Schmitt trigger 24 changes state and the input from inverter 24 to gate 25 goes low and the output from gate 25 ceases. The output from gate 25 prior to this is the reverse of the input from transistor 37 and inverter 26 restores the original signal. This signal forms one input to gate 27. The output from gate 27 is applied to the base of transistor 28 which applies current to the triac 2 through line 11. The other input to gate 27 is from a cross coupled RS flip flop formed by gates 29 and 30. If the output from gate 29 is high pulses will pass from gate 27 to transistor 28 but if the output from gate 29 is low then no pulses will be delivered by the output of gate 27 and there will be no drive to transistor 28 and triac 2.

A reset pulse is applied to gate 29 through capacitor 31 and a set input pulse is applied to gate 30 through resistor 32.

The clock 13 includes inverters 33 and 34, drives transistor 35 and thereby drives SCR 5 through line 9. One pulse is applied every 1 second in this example. Also at each second a reset pulse is sent through capacitor 31 to gate 29.

Capacitor 31 and resistor 36 form a reset time constant on the power supply lead in.

If line 10 goes low at a time other than when line 9 is high i.e. when SCR 5 is correctly on them, the input to gate 30 goes low and sets the flip flop which inhibits gate 27 and in turn stops charging through triac 2.

Provided line 10 goes low immediately after line 9 goes high to turn the SCR 5 on the circuit works normally but if line 10 goes low at any other time the flip flop is set and inhibits gate 27.

The other input to gate 27 is also connected through a resistor and capacitor to the base of transistor 35. This ensures that when line 10 goes low during abnormal operation a pulse is applied to the base of transistor 35 which applies base current to SCR 5 and ensures capacitor 4 is fully dicharged.

The transistor 37 detects the zero crossing of inputs 21 and 22, transistor 28 provides drive to the triac 2 and transistor 35 provides drive to SCR 5.

It will therefore be seen that at least in the preferred form of the invention an electric fence energizer is provided, which in a simple manner is able to control the output pulse so that the pulse never exceeds a frequency predetermined by the wiring and components of the 1 Hz clock circuit. The discharge repetition rate is therefore independent of input voltage on any uncontrolled switching action of semi-conductor switching elements in the capacitor discharge circuit. The output is therefore "safe" and cannot break down into a lethal high frequency output. Also, the output will not vary substantially with input once above the minimum level this being achieved without the use of a constant voltage transformer. The timing of the pulses is also independent of input frequency.

What we claim is:

1. An electric fence energizer of the capacitor discharge type, comprising:

an output transformer having a primary winding;

a capacitor connected across said power supply and the primary winding of said transformer;

an SCR means, connected between said capacitor and said transformer primary winding, for controllably discharging said capacitor through said transformer primary winding;

controllable switch means, connected between said power supply and said capacitor, for charging said capacitor by means of said power supply;

control circuit means for cyclically charging and discharging said capacitor by controlling said switch means and said SCR means, said control circuit means including means for charging said capacitor to substantially the same level in each cycle, said level being independent of minor fluctuations in said power supply; and a sense line connected to said control circuit means to sense the capacitor voltage, said control circuit means including means for inhibiting charging of said capacitor when said sense line detects that said SCR means has discharged abnormally.

2. The apparatus of claim 1 wherein said controllable switch comprises a triac.

3. The apparatus of claim 1 or 2 wherein said control circuit is capable of triggering said SCR means at a predetermined pulse interval.

4. The apparatus of claim 1 wherein said controllable switch comprises an integral portion of said power supply.

5. The apparatus of claim 1 wherein said control circuit means includes a clock circuit for triggering said SCR at predetermined intervals, said intervals being independent of the power supply voltage.

* * * * *

UNITED STATES PATENT AND TRADEMARK OFFICE
CERTIFICATE OF CORRECTION

PATENT NO. : 4,394,583
DATED : July 19, 1983
INVENTOR(S) : Colin Anthony Standing It is certified that error appears in the above-identified patent and that said Letters Patent is hereby corrected as shown below:

On the title page Insert

--(73) Assignee: Gallagher Electronics Limited, Hamilton, New Zealand --.

Signed and Sealed this

*Fifth* Day of *June 1984*

[SEAL]

*Attest:*

GERALD J. MOSSINGHOFF

*Attesting Officer* *Commissioner of Patents and Trademarks*